United States Patent
Gage et al.

(10) Patent No.: US 12,288,059 B2
(45) Date of Patent: Apr. 29, 2025

(54) OVER THE AIR ANALYTICS

(71) Applicant: Toyota Motor North America, Inc., Plano, TX (US)

(72) Inventors: Sergei Gage, Dallas, TX (US); Yusra El-Sharkawy, Murphy, TX (US); Jiju Thomas, Allen, TX (US)

(73) Assignees: TOYOTA MOTOR NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 18/160,853

(22) Filed: Jan. 27, 2023

(65) Prior Publication Data
US 2024/0256264 A1  Aug. 1, 2024

(51) Int. Cl.
| | |
|---|---|
| *H04W 4/06* | (2009.01) |
| *G06F 8/65* | (2018.01) |
| *G06F 8/654* | (2018.01) |
| *H04L 67/00* | (2022.01) |
| *H04W 4/44* | (2018.01) |
| *H04W 4/50* | (2018.01) |

(52) U.S. Cl.
CPC .............. *G06F 8/654* (2018.02); *H04L 67/34* (2013.01); *G06F 8/65* (2013.01); *H04W 4/44* (2018.02); *H04W 4/50* (2018.02)

(58) Field of Classification Search
CPC . G06F 8/654; G06F 8/65; H04L 67/34; H04L 67/55; H04W 4/44; H04W 4/021
See application file for complete search history.

(56) References Cited

U.S. PATENT DOCUMENTS

| | | | |
|---|---|---|---|
| 10,470,189 B2 | 11/2019 | Tran et al. | |
| 10,496,394 B2 | 12/2019 | Frantz et al. | |
| 10,534,602 B2 | 1/2020 | Miller et al. | |

(Continued)

FOREIGN PATENT DOCUMENTS

| | | |
|---|---|---|
| CN | 111726749 A | 9/2020 |
| DE | 102020004570 A1 | 1/2022 |

OTHER PUBLICATIONS

Kai Yang et al., Federated Learning via Over-the-Air Computation, Mar. 2020, [Retrieved on Dec. 10, 2024]. Retrieved from the internet: <URL: https://ieeexplore.ieee.org/stamp/stamp.jsp?tp=&arnumber=8952884> 14 Pages (2022-2035) (Year: 2020).*

(Continued)

*Primary Examiner* — Anibal Rivera
(74) *Attorney, Agent, or Firm* — Jordan IP Law, LLC

(57) ABSTRACT

A system is provided for use with over-the-air (OTA) analytic data corresponding to OTA aggregate data associated with an OTA push of a software update to a plurality of devices. The system includes: a data receiver configured to receive the OTA aggregate data; a memory having instructions stored therein; and a processor configured to execute the instructions stored in the memory to cause the system to: store the received OTA aggregate data into the memory; analyze the OTA aggregate data to determine an optimized time period for the OTA push; predict a future OTA push time period based on the optimized time period; and generate a future OTA push instruction based on the predicted future OTA push time period.

20 Claims, 12 Drawing Sheets

(56) References Cited

U.S. PATENT DOCUMENTS

| 10,812,624 | B2 | 10/2020 | Wu et al. |
| 11,206,513 | B1 | 12/2021 | John et al. |
| 2019/0259223 | A1* | 8/2019 | Sangameswaran .. G07C 5/0841 |
| 2020/0092396 | A1* | 3/2020 | Wu ..................... H04W 72/121 |
| 2020/0117438 | A1* | 4/2020 | Withun .................... G06F 8/65 |
| 2024/0022883 | A1* | 1/2024 | Lei .......................... H04L 67/34 |

OTHER PUBLICATIONS

Fizza, Kaneez, et al., "Faster OTA Updates in Smart Vehicles using Fog Computing", CloudAM 2019 Workshop, UCC 19 Companion, Dec. 2-5, 2019, Auckland, New Zealand, pp. 59-64. (https://www.researchgate.net/publication/337687569_Faster_OTA_Updates_in_Smart_Vehicles_using_Fog_Computing).

* cited by examiner

OVER THE AIR ANALYTICS

BACKGROUND

Embodiments of the present disclosure relate to systems that provide over-the-air (OTA) software updates for firmware devices.

SUMMARY

An aspect of the present disclosure is drawn to a system for use with over-the-air (OTA) analytic data corresponding to OTA aggregate data associated with an OTA push of a software update to a plurality of devices. The system includes: a data receiver configured to receive the OTA aggregate data; a memory having instructions stored therein; and a processor configured to execute the instructions stored in the memory to cause the system to: store the received OTA aggregate data into the memory; analyze the OTA aggregate data to determine an optimized time period for the OTA push; predict a future OTA push time period based on the optimized time period; and generate a future OTA push instruction based on the predicted future OTA push time period.

In some embodiments of this aspect, the processor is further configured to execute the instructions stored in the memory to additionally cause the system to: analyze the OTA aggregate data to determine an optimized time period for a predetermined time zone for the OTA push; predict a future OTA push time period for the predetermined time zone based on the optimized time period for the predetermined time zone; and generate a future OTA push instruction for the predetermined time zone based on the predicted future OTA push time period for the predetermined time zone.

In some embodiments of this aspect, the processor is further configured to execute the instructions stored in the memory to additionally cause the system to: analyze the OTA aggregate data to determine an optimized time period for a predetermined country for the OTA push; predict a future OTA push time period for the predetermined time zone based on the optimized time period for the predetermined country; and generate a future OTA push instruction for the predetermined time zone based on the predicted future OTA push time period for the predetermined country.

In some embodiments of this aspect, the system is for additional use with a display, wherein the processor is further configured to execute the instructions stored in the memory to additionally cause the system to generate graphic user interface data to be provided to the display to cause the display to display a graphic user interface associated with the predicted future OTA push time period based on at least one of a predetermined time zone and a predetermined country.

In some embodiments of this aspect, the processor is further configured to execute the instructions stored in the memory to additionally cause the system to analyze the OTA aggregate data to determine an optimized time period for the OTA push via a machine learning algorithm. In some of these embodiments, the processor is further configured to execute the instructions stored in the memory to additionally cause the system to analyze the OTA aggregate data to determine an optimized time period for the OTA push via a neural network performing the machine learning algorithm.

In some embodiments of this aspect, the data receiver is configured to receive OTA aggregate data via at least one of a cellular network and a wired network.

Another aspect of the present disclosure is drawn to a method of using a system with over-the-air (OTA) analytic data corresponding to OTA aggregate data associated with an OTA push of a software update to a plurality of devices. The method includes: receiving, via a data receiver, the OTA aggregate data; storing, via a processor configured to execute instruction stored in a memory, the received OTA aggregate data into the memory; analyzing, via the processor, the OTA aggregate data to determine an optimized time period for the OTA push; predicting, via the processor, a future OTA push time period based on the optimized time period; and generating, via the processor, a future OTA push instruction based on the predicted future OTA push time period.

In some embodiments of this aspect, the method further includes: analyzing, via the processor, the OTA aggregate data to determine an optimized time period for a predetermined time zone for the OTA push; predicting, via the processor, a future OTA push time period for the predetermined time zone based on the optimized time period for the predetermined time zone; and generating, via the processor, a future OTA push instruction for the predetermined time zone based on the predicted future OTA push time period for the predetermined time zone.

In some embodiments of this aspect, the method further includes: analyzing, via the processor, the OTA aggregate data to determine an optimized time period for a predetermined country for the OTA push; predicting, via the processor, a future OTA push time period for the redetermined time zone based on the optimized time period for the predetermined country; and generating, via the processor, a future OTA push instruction for the predetermined time zone based on the predicted future OTA push time period for the predetermined country.

In some embodiments of this aspect, the method further is for additional use with a display, and further includes generating, via the processor, graphic user interface data to be provided to the display to cause the display to display a graphic user interface associated with the predicted future OTA push time period based on at least one of a predetermined time zone and a predetermined country.

In some embodiments of this aspect, the method further includes analyzing, via the processor, the OTA aggregate data to determine an optimized time period for the OTA push via a machine learning algorithm. In some of these embodiments, the method further includes analyzing, via the processor, the OTA aggregate data to determine an optimized time period for the OTA push via a neural network performing the machine learning algorithm.

In some embodiments of this aspect, the receiving, via the data receiver, the OTA aggregate data comprises receiving OTA aggregate data via at least one of a cellular network and a wired network.

Another aspect of the present disclosure is drawn to a non-transitory, computer-readable media having computer-readable instructions stored thereon, the computer-readable instructions being capable of being read by a system for use with over-the-air (OTA) analytic data corresponding to OTA aggregate data associated with an OTA push of a software update to a plurality of devices, wherein the computer-readable instructions are capable of instructing the system to perform the method including: receiving, via a data receiver, the OTA aggregate data; storing, via a processor configured to execute instruction stored in a memory, the received OTA aggregate data into the memory; analyzing, via the processor, the OTA aggregate data to determine an optimized time period for the OTA push; predicting, via the processor, a future OTA push time period based on the optimized time period; and generating, via the processor, a future OTA push instruction based on the predicted future OTA push time period.

In some embodiments of this aspect, the computer-readable instructions are capable of instructing the system to perform the method further including: analyzing, via the processor, the OTA aggregate data to determine an optimized time period for a predetermined time zone for the OTA push; predicting, via the processor, a future OTA push time period for the predetermined time zone based on the optimized time period for the predetermined time zone; and generating, via the processor, a future OTA push instruction for the predetermined time zone based on the predicted future OTA push time period for the predetermined time zone.

In some embodiments of this aspect, the computer-readable instructions are capable of instructing the system to perform the method further including: analyzing, via the processor, the OTA aggregate data to determine an optimized time period for a predetermined country for the OTA push; predicting, via the processor, a future OTA push time period for the predetermined time zone based on the optimized time period for the predetermined country; and generating, via the processor, a future OTA push instruction for the predetermined time zone based on the predicted future OTA push time period for the predetermined country.

In some of the embodiments of this aspect, the system is for additional use with a display, wherein the computer-readable instructions are capable of instructing the system to perform the method further including generating, via the processor, graphic user interface data to be provided to the display to cause the display to display a graphic user interface associated with the predicted future OTA push time period based on at least one of a predetermined time zone and a predetermined country.

In some embodiments of this aspect, the computer-readable instructions are capable of instructing the system to perform the method further including analyzing, via the processor, the OTA aggregate data to determine an optimized time period for the OTA push via a machine learning algorithm. In some of these embodiments, the computer-readable instructions are capable of instructing the system to perform the method further including analyzing, via the processor, the OTA aggregate data to determine an optimized time period for the OTA push via a neural network performing the machine learning algorithm.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Figure 1A:
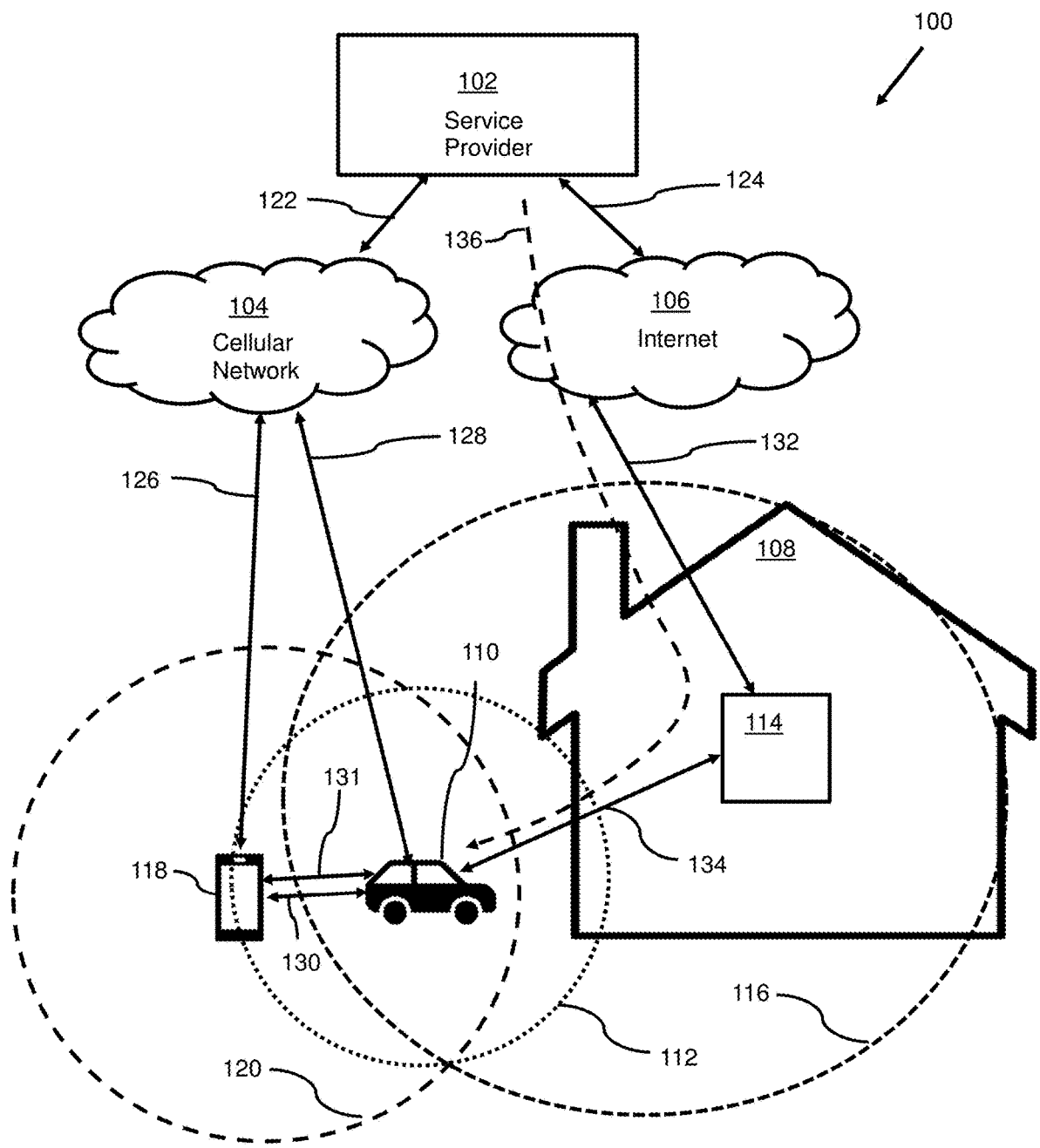
FIG. 1A illustrates an example OTA vehicle software update system in accordance with aspects of the present disclosure.

Modern vehicles are often connected vehicles that are able to remotely communicate with external servers or other computing devices. As such, software updates can be remotely transmitted from a vehicle manufacturer or other provider to a vehicle via an over-the-air (OTA) mechanism (e.g., via Wi-Fi). This can allow vehicle features to be updated without requiring an owner to visit a dealership or service station. This software can relate to autonomous driving features (e.g., collision avoidance software), navigation features (e.g., turn-by-turn driving direction), entertainment features (e.g., audio/video features), and other features.

When an OTA software update is created and released, it may be useful to record metrics or analytics about how the OTA software update is received by customers. This may allow the software provider to improve how OTA software updates are provided in the future.

In some cases, wherein a vehicle is not running, the pushed OTA software update is not received by the vehicle. In some cases, a vehicle may have one type of wireless communication capability, such as Wi-Fi, whereas the pushed OTA software update is sent only via a cellular network, wherein the pushed OTA software update is not received by the vehicle. In some cases, if the vehicle has Wi-Fi capability, and the OTA software update is pushed so as to be provided by a Wi-Fi capable access point, the vehicle may only receive the pushed OTA software update when the vehicle is near enough to onboard onto, if the vehicle is able to onboard onto, the access point.

For above-mentioned reasons, and many more, all vehicles for which the pushed OTA software update is targeted might not receive the pushed OTA software update when initially pushed. For this reason, the OTA software update may need to be pushed for an extended period of time. This greatly increases server use, and thus greatly increases the overall costs associated with providing the OTA software update.

What is needed is a system and method for reducing the amount of time needed to push an OTA software update and thus reducing server use.

An OTA software update providing system and method in accordance with the present disclosure reduces the amount of time needed to push an OTA software update and thus reduces server use over that of conventional OTA software update providing systems and methods.

When a dealership, manufacturer, or other provider of vehicle software updates provides an OTA software update to a vehicle, the provider receives information about how the software update was received by the vehicle. This information may be aggregated and presented to the dealership or manufacturer in the form of a software dashboard, which is a graphical representation of the aggregated data. For example, the dashboard may indicate if the update was successful or if it failed, or other status information related to OTA software updates. The data may also indicate various customer behaviors related to OTA software updates. If a particular OTA software update failed, the dashboard may indicate why the update failed, the type of failure, the time of the failure, and the like.

During an OTA software update to a vehicle, the vehicle may record information about the downloading and installation of the OTA software update to local hardware. This analytics information may then be wirelessly uploaded to the dealership, manufacturer, or other provider of vehicle software updates via Wi-Fi or other wireless communication protocol. In accordance with aspects of the present disclosure, this analytics information may be aggregated from multiple vehicles to generate aggregate analytics data to present via the dashboard.

After generating aggregated analytics data, in accordance with aspects of the present disclosure, machine learning may be performed on the aggregated analytics data to predict an optimal time to push out future OTA software updates in order to have more customers accept the updates. Machine learning could also be used to learn other information about how customers are utilizing OTA software updates and the OTA feature more generally.

An OTA software update providing system and method in accordance with the present disclosure will now be described in greater detail with reference to FIGS. 1-7B.

FIG. 1A illustrates an example OTA vehicle software update system 100 in accordance with aspects of the present disclosure. As shown in the figure, OTA vehicle software update system 100 includes a service provider 102, a cellular network 104, a wide area network such as the internet 106, a building 108, a vehicle 110, and a wireless handheld device 118. Building 108 includes a gateway router 114 disposed therein.

Service provider 102 provides OTA software updates to a plurality of devices, including vehicle 110.

Cellular network 104 is a communication network where the link to and from end nodes is wireless. The network is distributed over land areas called "cells," each served by at least one fixed-location transceiver (typically three cell sites or base transceiver stations). These base stations provide the cell with the network coverage which can be used for transmission of voice, data, and other types of content. A cell typically uses a different set of frequencies from neighboring cells, to avoid interference and provide guaranteed service quality within each cell. When joined together, these cells provide radio coverage over a wide geographic area. This enables numerous portable transceivers (e.g., mobile phones, tablets and laptops equipped with mobile broadband modems, pagers, etc.) to communicate with each other and with fixed transceivers and telephones anywhere in the network, via base stations, even if some of the transceivers are moving through more than one cell during transmission.

Internet 106 is the global system of interconnected computer networks that uses the Internet protocol suite (TCP/IP) to communicate between networks and devices.

Gateway router 114 performs two functions, it acts as a gateway and as a wireless router. As a router, gateway router 114 creates a wireless network 116 wherein devices may wirelessly communicate with one another through gateway router 114. As a gateway, gateway router 114 routes traffic from wireless network 116 to internet 106 via a communication channel 132.

Service provider 102 is configured to communicate with cellular network 104 via a wireless cellular communication channel 122 and to communicate with the internet 106 via a communication channel 124.

Cellular network 104 is additionally configured to wirelessly communicate with vehicle 110 via a communication channel 128 and to wirelessly communicate with wireless handheld device 118 via a communication channel 126.

Wireless handheld device 118 is additionally configured to wirelessly communicate with vehicle 110 via a communication channel 130 via a wireless network 120 created by wireless handheld device 118. Alternatively, vehicle 110 is configured to wirelessly communicate with wireless handheld device 118 via a communication channel 131 via a wireless network 112 created by vehicle 110.

Vehicle 110 is additionally configured to wirelessly communicate with gateway router 114 via a communication channel 134 via a wireless network 116 created by gateway router 114.

As mentioned above, gateway router 114 is additionally configured to wirelessly communicate with internet 106 via communication channel 132.

Communication channels 122, 126, 128, and 134 are wireless communication channels. In particular, communication channels 122, 126 and 128 are cellular communication channels. Communication channels 130 and 131 may be wireless or wired communication channels. For example, when wireless, communication channels 130 and 131 may be any one type of channel that uses IEEE 702.11 Wi-Fi protocols, such as the Wi-Fi 4, 5, 6, or 6E protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 702.15.4 protocol. When wired, communication channels 130 and 131 may use any known wired protocol, such as USB. Communication channel 134 may additionally be one type of channel that uses IEEE 702.11 Wi-Fi protocols, such as the Wi-Fi 4, 5, 6, or 6E protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 702.15.4 protocol.

Communication channels 124 and 132 may typically be wired communication channels that use known wired communication protocols, such as data over cable service interface specification (DOCSIS), digital subscriber line (DSL), or passive optical network (PON).

Service provider 102 may provide OTA software updates to vehicle 110 via multiple optional pathways. For example, as shown in FIG. 1A, service provider 102 may provide an OTA software update to vehicle 110 via a pathway 136 that includes communication channel 124, internet 106, communication channel 132, gateway router 114, then wireless network 116. It should be noted that service provider 102 may only provide OTA software updates to vehicle 110 via pathway 136 if vehicle 110 has a communication system that is able to wirelessly communicate with gateway router 114, if vehicle 110 is sufficiently close to gateway router 114 to receive wireless communication from wireless network 116, and the communication system within vehicle 110 is operating when the OTA software update is pushed. If any of these conditions are not met, then vehicle 110 may not receive the pushed OTA software update.

Figure 1B:
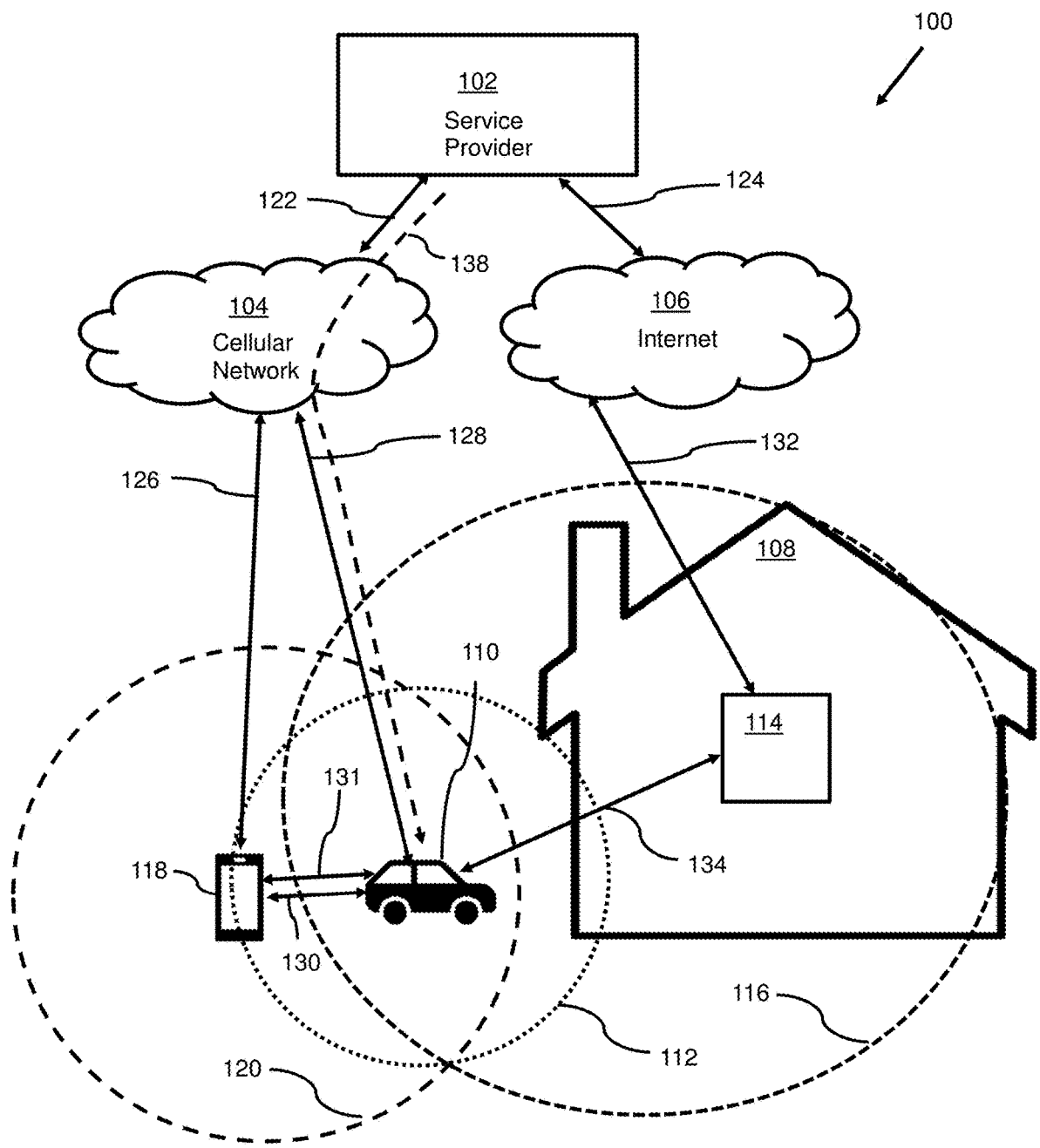
FIG. 1B illustrates the example OTA vehicle software update system of FIG. 1A, wherein a cellular network is used.

As shown in FIG. 1B, service provider 102 may provide an OTA software update to vehicle 110 via a pathway 138 that includes communication channel 122, cellular network 104, and communication channel 128. Again, it should be noted that service provider 102 may only provide OTA software updates to vehicle 110 via pathway 138 if vehicle 110 has a communication system that is able to wireless communicate with cellular network 104, if vehicle 110 has a sufficiently strong signal to receive wireless communication from cellular network 104, and the communication system within vehicle 110 is operating when the OTA software update is pushed. If any of these conditions are not met, then vehicle 110 may not receive the pushed OTA software update.

Figure 1C:
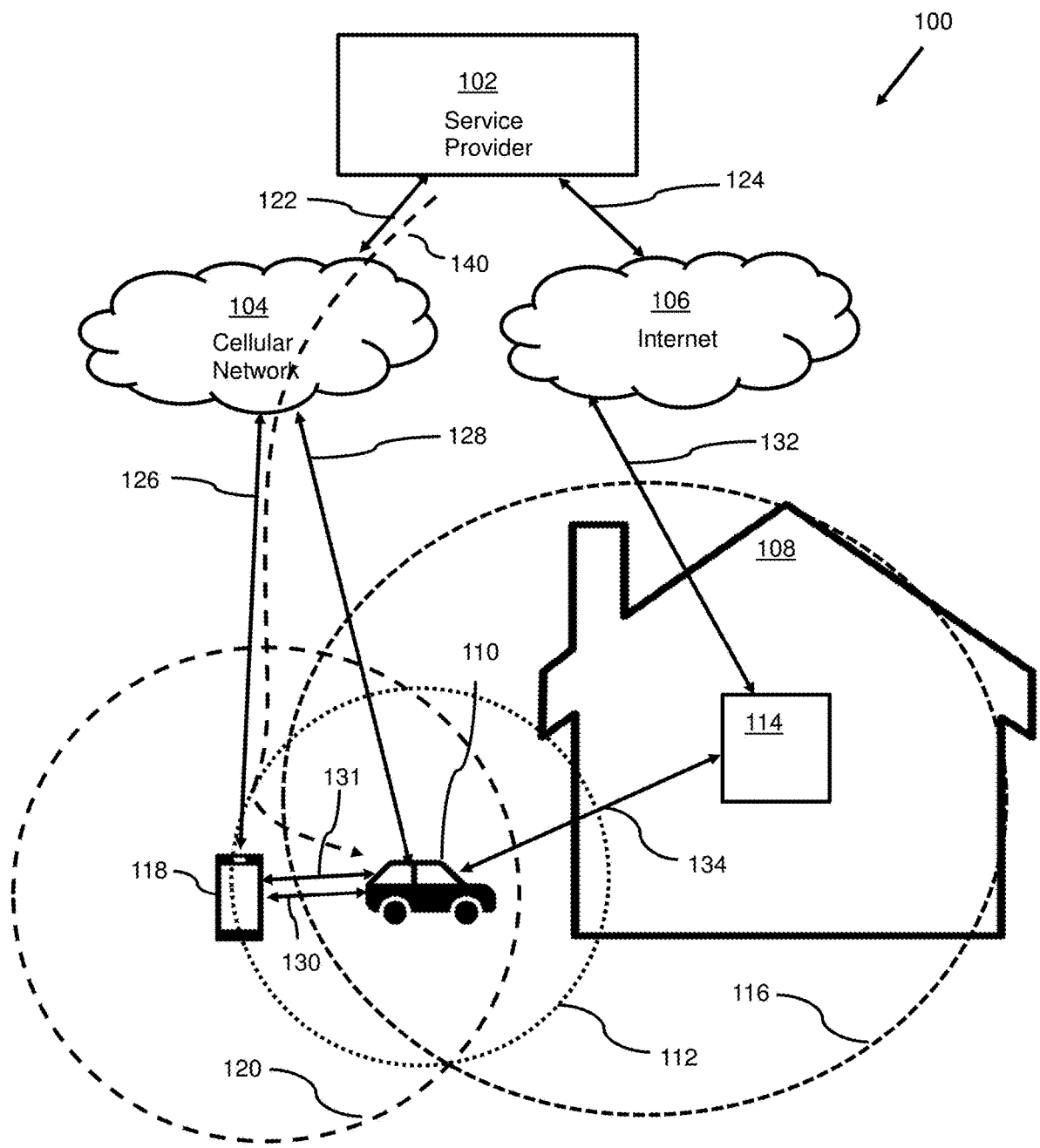
FIG. 1C illustrates the example OTA vehicle software update system of FIG. 1A, wherein the cellular network and a wireless handheld device is used.

As shown in FIG. 1C, service provider 102 may provide an OTA software update to vehicle 110 via a pathway 138 that includes communication channel 122, cellular network 104, communication channel 126, wireless handheld device 118, and finally: via communication channel 130 when vehicle 110 is in communication with wireless handheld device 118 via wireless network 120 created by wireless handheld device 118; or via communication channel 131 when vehicle 110 is in communication with wireless handheld device 118 via wireless network 112 created by vehicle 110. Again, it should be noted that service provider 102 may only provide OTA software updates to vehicle 110 via pathway 140 if vehicle 110 has a communication system that is able to wireless communicate with wireless handheld device 118, if vehicle 110 has a sufficiently strong signal to receive wireless communication from wireless handheld device 118, and the communication system within vehicle 110 is operating when the OTA software update is pushed. If any of these conditions are not met, then vehicle 110 may not receive the pushed OTA software update.

Figure 2A:
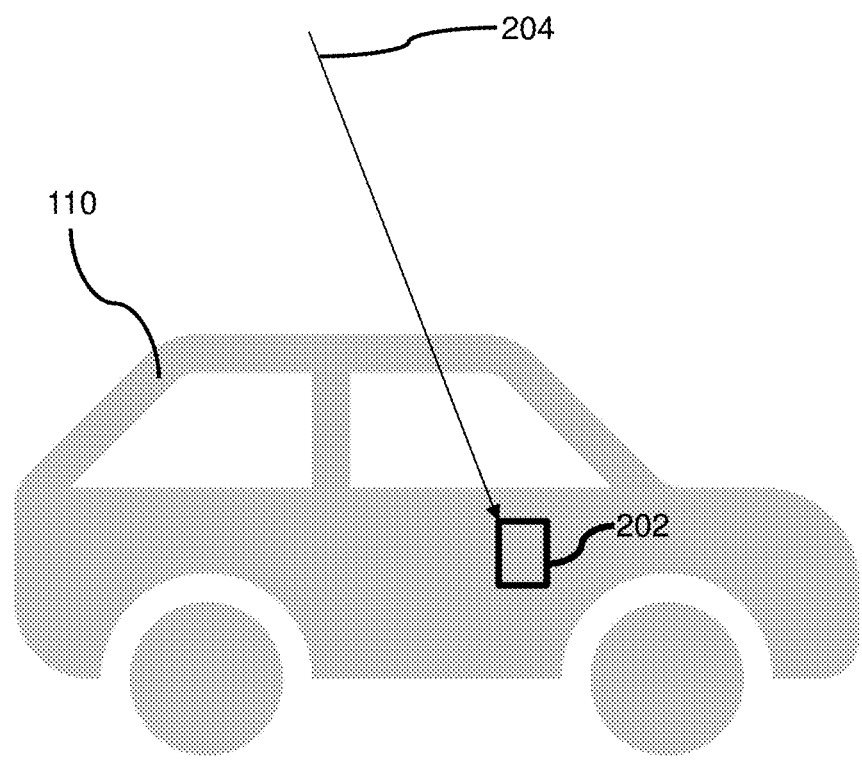
FIG. 2A illustrates an example vehicle receiving an OTA software update in accordance with aspects of the present disclosure.

FIG. 2A illustrates vehicle 110 receiving an OTA software update 204 in accordance with aspects of the present disclosure. As shown in the figure, vehicle 110 includes a firmware system 202 that is configured to wirelessly receive OTA software update 204. Vehicle 110 may receive OTA software update 204 via any of the multiple pathways discussed above with reference to FIGS. 1A-C. Further, in this example, firmware system 202 may relate to autonomous driving features (e.g., collision avoidance software), navigation features (e.g., turn-by-turn driving direction), entertainment features (e.g., audio/video features), other features, and combinations thereof. Still further, while shown as a single element, firmware system 202 may be a combination of firmware systems, wherein each one relates to autonomous driving features (e.g., collision avoidance software), navigation features (e.g., turn-by-turn driving direction), entertainment features (e.g., audio/video features), or other features. Finally, in the case that firmware system 202 is a combination of firmware systems, each one may be configured to wirelessly receive a respective OTA software update by a different pathways as discussed above with reference to FIGS. 1A-C.

Once vehicle 110 receives the OTA software update, vehicle 110 may transmit metric data back to service provider 102. This metric data may include information related to: the download start date/time of downloading the OTA software update; the download time period for downloading the OTA software update; whether the OTA software update was installed; whether there are any errors in installing the OTA software update; the location of the vehicle 110 when the OTA software update was downloaded; the previous most recent version of the OTA software update in firmware system 202; the IP address of vehicle 110; the pathway for which the OTA software update was received, e.g., via Wi-Fi or cellular networks; and combinations thereof. This will be described in greater detail with reference to FIG. 2B.

Figure 2B:
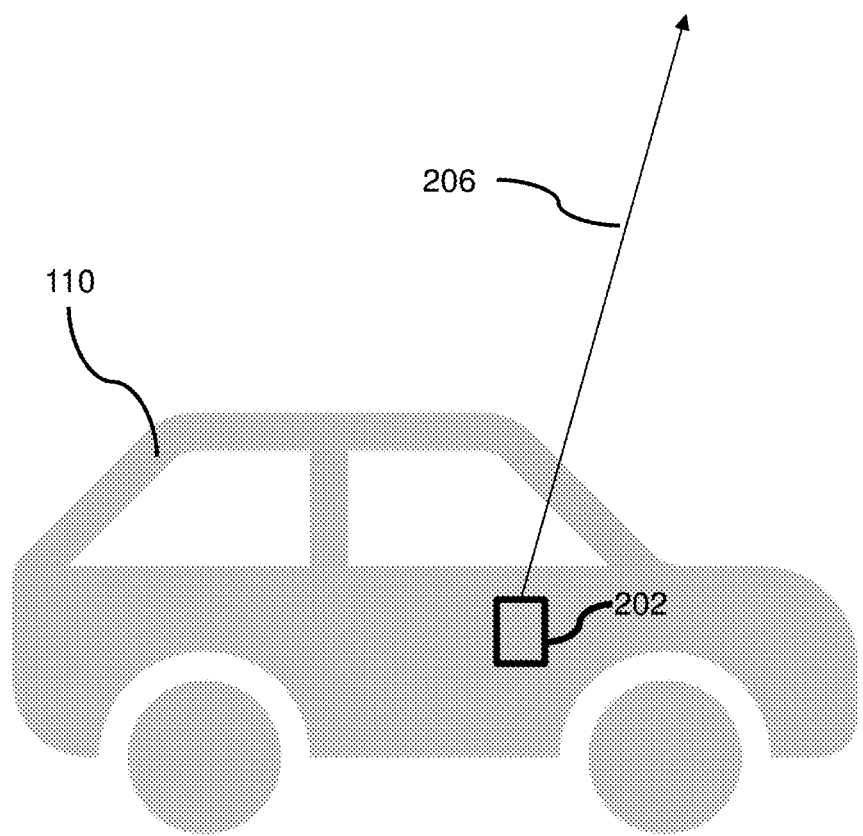
FIG. 2B illustrates the vehicle of FIG. 2A transmitting OTA metric data in accordance with aspects of the present disclosure.

FIG. 2B illustrates the vehicle of FIG. 2A transmitting OTA metric data 206 in accordance with aspects of the present disclosure. As shown in FIG. 2B, vehicle 110 the firmware system 202 is additionally configured to wirelessly transmit OTA metric data 206 via any of the multiple pathways discussed above with reference to FIGS. 1A-C.

Service provider 102 will receive the OTA metric data 206 from vehicle 110 in addition to OTA metric data from all other vehicles for which the OTA software update was pushed. Service provider 102 will analyze this aggregate metric data to predict an optimal future time period to push the next OTA software update. This will be described in greater detail with reference to FIGS. 3-7B.

Figure 3:
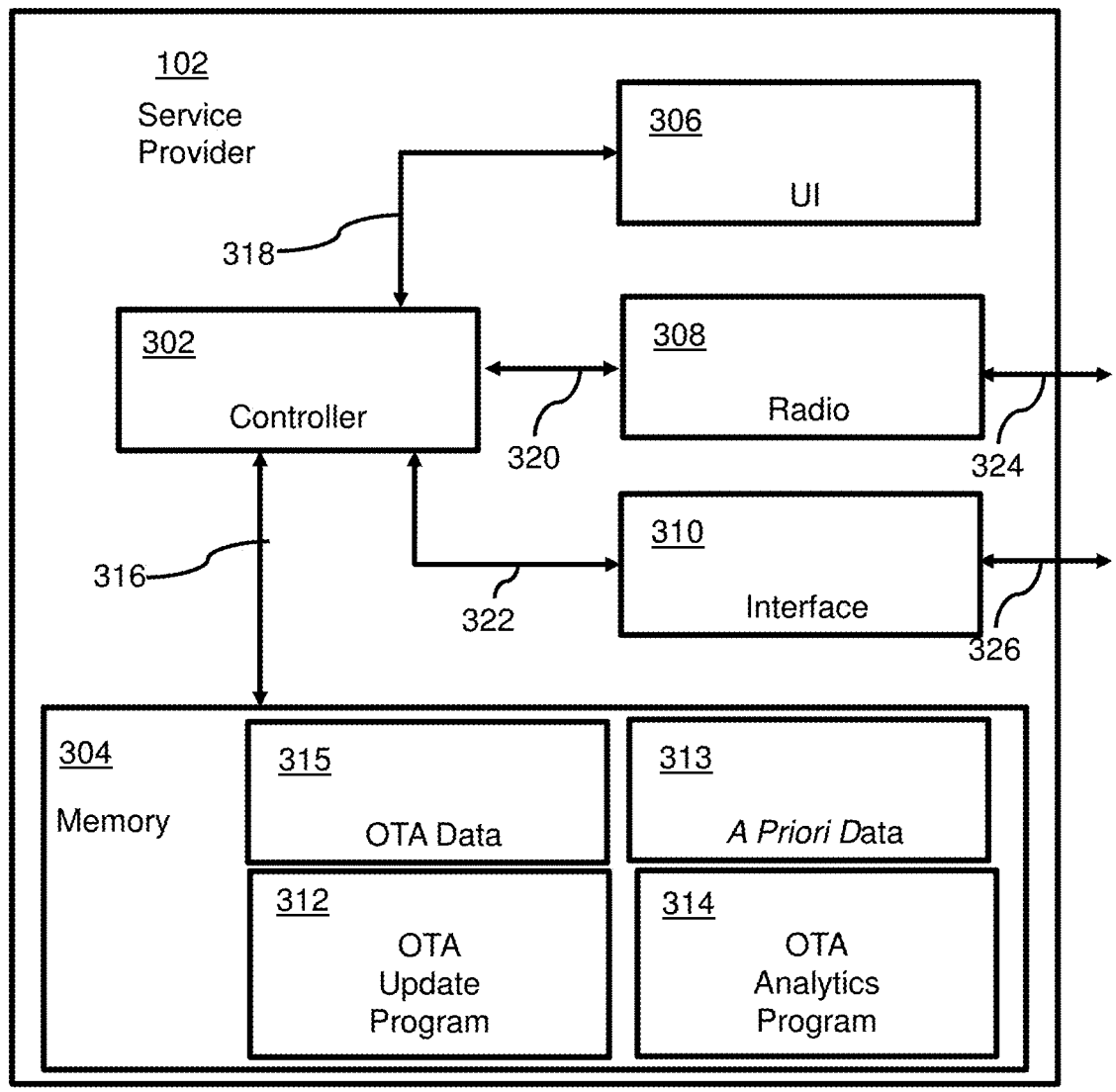
FIG. 3 illustrates a detailed view of the service provider of FIG. 1.

FIG. 3 illustrates a detailed view of service provider 102 of FIG. 1. As shown in FIG. 3, service provider 102 includes a controller 302, a memory 304, a user interface (UI) 306, a radio 308 and an interface 310. Memory 304 includes, stored therein, OTA update instructions 312, a priori data 313, OTA analytics instructions 314, and OTA data 315.

In this example, controller 302, memory 304, user interface (UI) 306, radio 308 and interface 310 are illustrated as individual devices. However, in some embodiments, at least two of controller 302, memory 304, UI 306, radio 308 and interface 310 may be combined as a unitary device. Further, in some embodiments, at least one of controller 302, memory 304, UI 306, radio 308 and interface 310 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 302 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of service provider 102 in accordance with the embodiments described in the present disclosure.

Memory 304 has an OTA update program 312, a priori data 313, and an OTA analytics program 314 stored therein. As will be described in greater detail below, OTA update program 312 has instructions stored therein to be executed by controller 302 to cause service provider 102 to: push an OTA software update to a plurality of devices, including vehicle 110; and to store received OTA aggregate data into an OTA data 315 of memory 304. As will be described in greater detail below, OTA analytics program 314 has instructions stored therein to be executed by controller 302 to cause service provider 102 to: analyze the OTA aggregate data to determine an optimized time period for the pushed OTA software update; predict a future OTA push time period based on the optimized time period; and generate a future OTA push instruction based on the predicted future OTA push time period.

In some embodiments, as will be described in greater detail below, OTA analytics program 314 has instructions stored therein to be executed by controller 302 to cause service provider 102 to: analyze the OTA aggregate data to determine an optimized time period for a predetermined time zone for the OTA push; predict a future OTA push time period for the predetermined time zone based on the optimized time period for the predetermined time zone; and generate a future OTA push instruction for the predetermined time zone based on the predicted future OTA push time period for the predetermined time zone.

In some embodiments, as will be described in greater detail below, OTA analytics program 314 has instructions stored therein to be executed by controller 302 to cause service provider 102 to: analyze the OTA aggregate data to determine an optimized time period for a predetermined country for the OTA push; predict a future OTA push time period for the predetermined time zone based on the optimized time period for the predetermined country; and generate a future OTA push instruction for the predetermined time zone based on the predicted future OTA push time period for the predetermined country.

In some embodiments, as will be described in greater detail below, the service provider is for further use with a display, wherein the OTA analytics program 314 has instructions stored therein to be executed by controller 302 to cause service provider 102 to generate graphic user interface data to be provided to the UI 306 to cause a display of the UI 306 to display a graphic user interface associated with the predicted future OTA push time period based on at least one of a predetermined time zone and a predetermined country.

In some embodiments, as will be described in greater detail below, OTA analytics program 314 has instructions stored therein to be executed by controller 302 to cause service provider 102 to analyze the OTA aggregate data to determine an optimized time period for the OTA push via a machine learning algorithm. In some of these embodiments, as will be described in greater detail below, OTA analytics program 314 has instructions stored therein to be executed by controller 302 to cause service provider 102 to analyze the OTA aggregate data to determine an optimized time period for the OTA push via a neural network performing the machine learning algorithm.

UI 306 may be any device or system that is operable to enable a user to access and control controller 302. UI 306 may include one or more layers including a human-machine interface (HMI) machines with physical input hardware such a keyboards, mice, game pads and output hardware such as computer monitors, speakers, and printers. Additional UI layers in UI 306 may interact with one or more human senses, including: tactile UI (touch), visual UI (sight), and auditory UI (sound).

Radio 308 may include a Wi-Fi WLAN interface radio transceiver that is operable to communicate with a plurality of devices, including vehicle 110. Radio 308 includes one or more antennas and communicate wirelessly via one or more of the cellular band, the 2.4 GHz band, the 5 GHz band, the 6 GHz band, and the 6E GHz band, or at the appropriate band and bandwidth to implement any IEEE 702.11 Wi-Fi protocols, such as the Wi-Fi 4, 5, 6, or 6E protocols. Radio 308 can also be equipped with a radio transceiver/wireless communication circuit to implement a wireless connection in accordance with any cellular protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 702.15.4 protocol.

Interface 310 can include one or more connectors, such as RF connectors, or Ethernet connectors, and/or wireless communication circuitry, such as 5G circuitry and one or more antennas.

Controller 302 is configured to communicate with memory 304 via a communication channel 316, to communicate with UI 306 via a communication channel 318, to communicate with radio 308 via a communication channel 320 and to communicate with interface 310 via a communication channel 322. Radio 308 is additionally configured to wirelessly communicate with a plurality of devices, such as vehicle 110, via a wireless communication channel 324. Interface 310 is configured to communicate with the plurality of devices, such as vehicle, 110 via a wired communication channel 326.

The operation of service provider 102 will now be described in greater detail with reference to FIG. 4.

Figure 4:
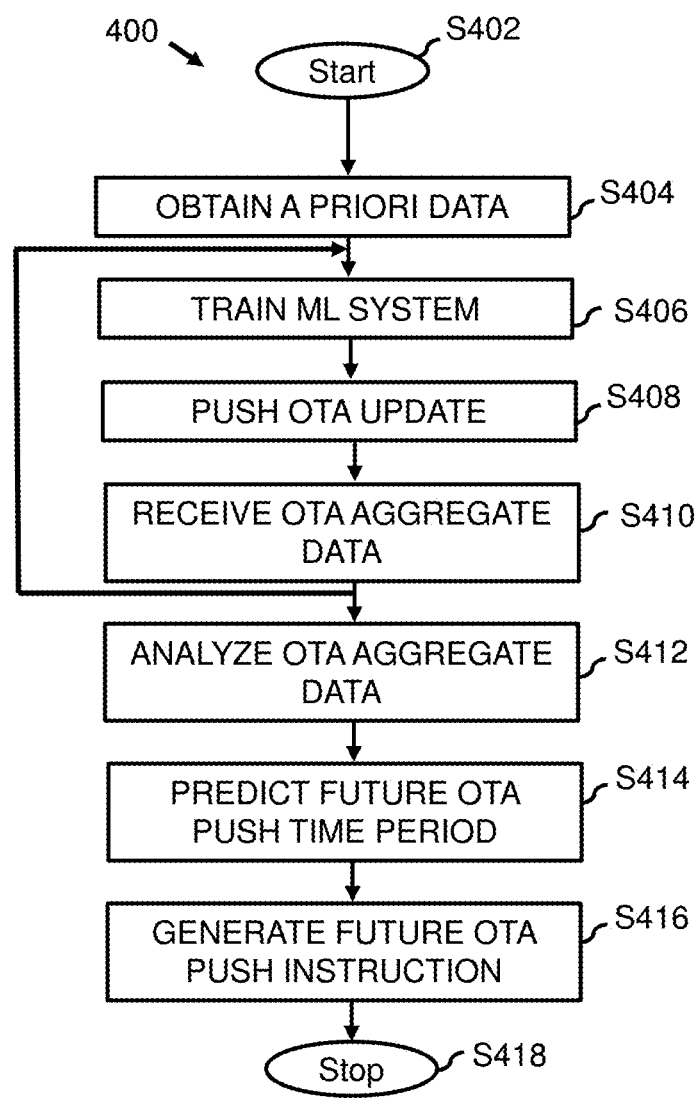
FIG. 4 illustrates an example method of pushing an OTA software update in accordance with aspects of the present disclosure.

FIG. 4 illustrates an example method 400 of pushing an OTA software update in accordance with aspects of the present disclosure. As shown in the figure, method 400 starts (S402), and a priori data is obtained (S404). For example, as shown in FIG. 3, controller 302 executes instructions in OTA analytics program to cause controller 302 to obtain a priori data from a priori data 313. Here a priori data 313 includes previous OTA aggregate data collected from prior OTA software update pushes.

Returning to FIG. 4, after the a priori data is obtained (S404), the ML system is trained (S406). For example, as shown in FIG. 3, controller 320 executes instructions in OTA analytics program 314 to cause controller 302 to train an ML system. This will be described in greater detail with reference to FIG. 8A.

Figure 7A:
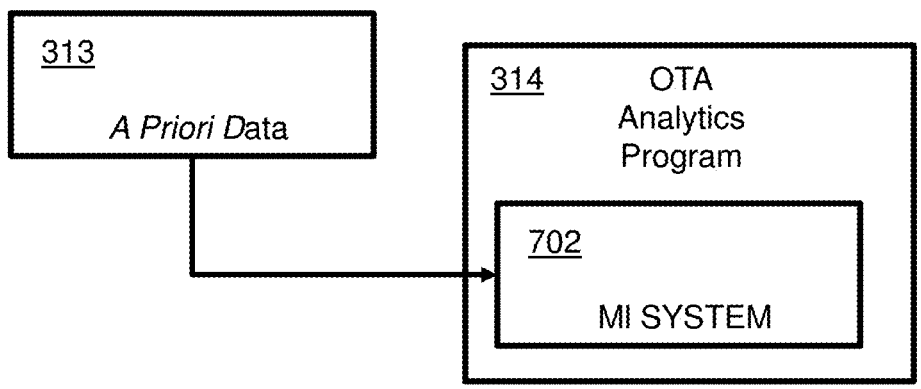
FIG. 7A illustrates a machine learning system being trained with a priori data in accordance with aspects of the present disclosure.

FIG. 7A illustrates a machine learning system being trained with a priori data in accordance with aspects of the present disclosure. As shown in the figure, OTA analytics program 314 includes a machine learning (ML) system 702. ML system 702 may include instructions, that when executed by controller 302, cause service provider 102 to determine an optimized time period for an OTA software update push. An ML system is an algorithm that 'learns', that is, an algorithm that leverage data to improve performance on some set of tasks. It is seen as a part of artificial intelligence. ML algorithms build a model based on sample data, known as training data, in order to make predictions or decisions without being explicitly programmed to do so.

FIG. 7A is a block diagram illustrating how controller 302 executes instructions in OTA analytics program 314. As shown in the figure, a machine learning (ML) system 702 resides within OTA analytics program 314, wherein ML system 802 is a set of instructions to be executed by controller 302. A priori data of the OTA aggregate data corresponding to previous OTA software update pushes from a priori data 313 is fed into ML system 702 to train ML system 702. ML system 802 may be any known type of ML system that is configured to minimize a cost function in order to most accurately associate all OTA aggregate data to a correctly recognized type of data.

For example, ML system 702 may include a neural network having a plurality of input nodes corresponding to data values of metric data which may include information related to: the download start date/time of downloading the OTA software update; the download time period for downloading the OTA software update; whether the OTA software update was installed; whether there are any errors in installing the OTA software update; the location of the vehicle 110 when the OTA software update was downloaded; the previous most recent version of the OTA software update in firmware system 202; the IP address of vehicle 110; the pathway for which the OTA software update was received, e.g., via Wi-Fi or cellular networks; and combinations thereof. The neural network may additionally include a plurality of output nodes corresponding to time frames, non-limiting examples of which include days of the week and hours of the day. The neural network may additionally include a plurality of hidden nodes disposed between the input nodes and the output nodes. Connections between the input nodes and the hidden nodes, and connections between the hidden nodes and the output nodes may each have respective weighting functions and biases.

Feeding the a priori data of the OTA aggregate data corresponding to previous OTA software update pushes from a priori data 313 into ML system 702 ultimately optimizes the output of ML system 702 so as to be able to accurately predict a future time period for an OTA software update push to maximize installation over all vehicles.

Returning to FIG. 4, after the ML system is trained (S406), an OTA software update is pushed (S408). For example, as shown in FIGS. 1A-C, service provider 102 pushes an OTA software update to vehicle 110.

More particularly, as shown in FIG. 3, controller 302 executes instructions in OTA update program 312, which in this case includes the OTA software update, to cause at least one of radio 308 and interface 310 to transmit the OTA software update to vehicle 110 (not shown). In particular, in the case where the pathway is initially wireless, for example as shown in FIGS. 1B-C, wherein the pathway initiates via cellular network 104, then radio 308 will transmit the OTA software update to vehicle 110. However, in the case where the pathway is initially wired, for example as shown in FIG. 1A, wherein the pathway initiates via internet 106, then interface 310 will transmit the OTA software update. Further, in the case where multiple pathways are used to push the OTA software update, then both radio 308 and interface 310 may transmit the OTA software update to vehicle 110.

Returning to FIG. 4, after the OTA software update is pushed (S408), OTA aggregate data is received (S410). For example, as shown in FIG. 2B, vehicle 110 may transmit OTA metric data to service provider 102. As mentioned previously, service provider 102 may receive this type of OTA metric data from many vehicles for which the OTA software update was pushed.

In particular, as shown in FIG. 3, at least one of radio 308 and interface 310 may receive the OTA metric data from vehicle 110 (not shown), and further from all the vehicles for which the OTA software update was pushed. In particular, in the case where the pathway is ultimately wireless, for example as shown in FIGS. 1B-C, wherein the pathway from vehicle 110 to service provider 102 ends via cellular network 104, then radio 308 will receive the OTA metric data from vehicle 110 and further from all the vehicles for which the OTA software update was pushed. However, in the case where the pathway is ultimately wired, for example as shown in FIG. 1A, wherein the pathway from vehicle 110 to service provider 102 ends via internet 106, then interface 310 will receive the OTA metric data from vehicle 110 and further from all the vehicles for which the OTA software update was pushed. Further, in the case where multiple pathways are used to receive the OTA metric data from vehicle 110 and further from all the vehicles for which the OTA software update was pushed, then both radio 308 and interface 310 may receive the OTA metric data from vehicle 110 and further from all the vehicles for which the OTA software update was pushed.

Controller 302 then executes instruction in OTA data 315 to aggregate the received OTA metric data into OTA aggregate data. Controller 302 then executes instructions in OTA data 315 to store the OTA aggregate data in OTA data 315.

Returning to FIG. 4, after the OTA aggregate data is received (S410), the received aggregate data is used to further train the ML system (return to S406) and the OTA aggregate data is analyzed (S412). For example, as shown in FIG. 3, controller 302 executes instructions in OTA analytics program 314 to analyze the OTA aggregate data. This will be described in greater detail with reference to FIGS. 5A-6.

Figure 5A:
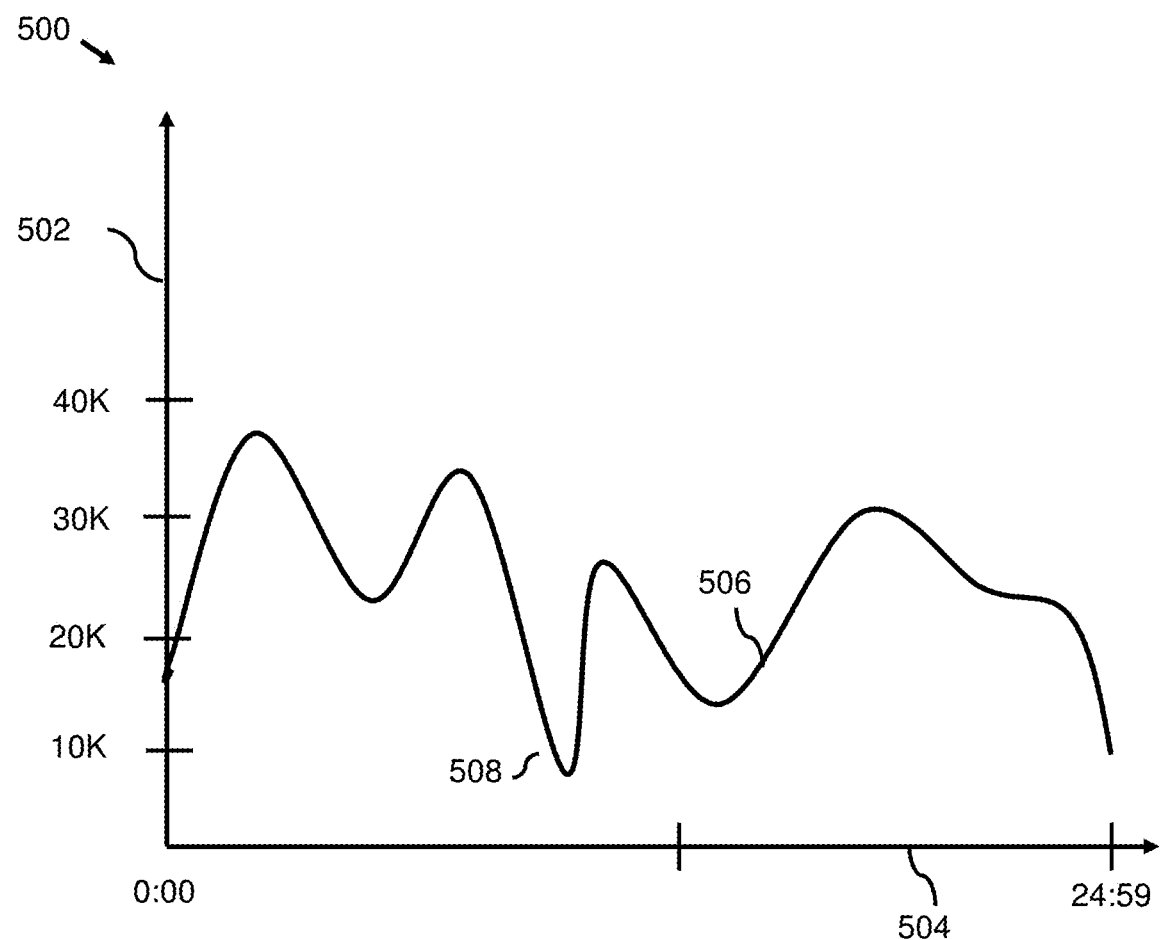
FIG. 5A illustrates an example graph of globally pushed OTA software updates being completely installed as a function time of day.

FIG. 5A illustrates an example graph 500 of globally pushed OTA software updates being completely installed as a function time of day. As shown in the figure, graph 500 includes a y-axis 502, an x-axis 504, and a function 506. Y-axis 502 corresponds to a number of completely installed global OTA software updates, whereas x-axis 504 corresponds to the time of day. Function 506 corresponds to the number of completely installed global OTA software updates as a function of the time of day.

It should be noted that the data from FIG. 5A has not been actually collected. On the contrary, the data from FIG. 5A is merely used to represent an issue for which a system and method in accordance with aspects of the present disclosure addresses. Namely, how and when pushed OTA software updates are installed. As shown in the figure, function 506 indicates that there are many fluctuations in the number of installations of the pushed OTA software. What would be beneficial, is to have a more constant installment rate.

In particular, as shown at point 508 of function 506, there is a minimum number of installments of the pushed OTA software update. In other words, even though server resources were used to push the OTA software update to many vehicles, at this time of day, relatively few actually installed the OTA software update. Accordingly, the OTA software update must be pushed again to ensure that these vehicles actually receive and install the OTA software update. This redundancy in pushing OTA software updates wastes server resources and therefore drastically increases the costs associated with pushing OTA software updates.

There are many reasons that pushed OTA software updates might not be received and downloaded. For example, as mentioned above, if a vehicle is not currently in a state to receive the pushed OTA software update, then the pushed OTA software update will not be received. This may happen in time zones where when the OTA software update is pushed, most people are sleeping, and therefore not operating the vehicles of which should be receiving the OTA software update. Further, this may happen for cultural reasons, wherein one culture might not work or travel on a particular day or time that happens to fall on the time of the OTA software update push. Further, this may happen for political reasons, wherein one country, state, or locality might have restrictions that restrict cellular, or other communication network, communication at a time that happens to fall on the time of the OTA software update push. This will be described in greater detail with reference to FIGS. 5B-6.

Figure 5B:
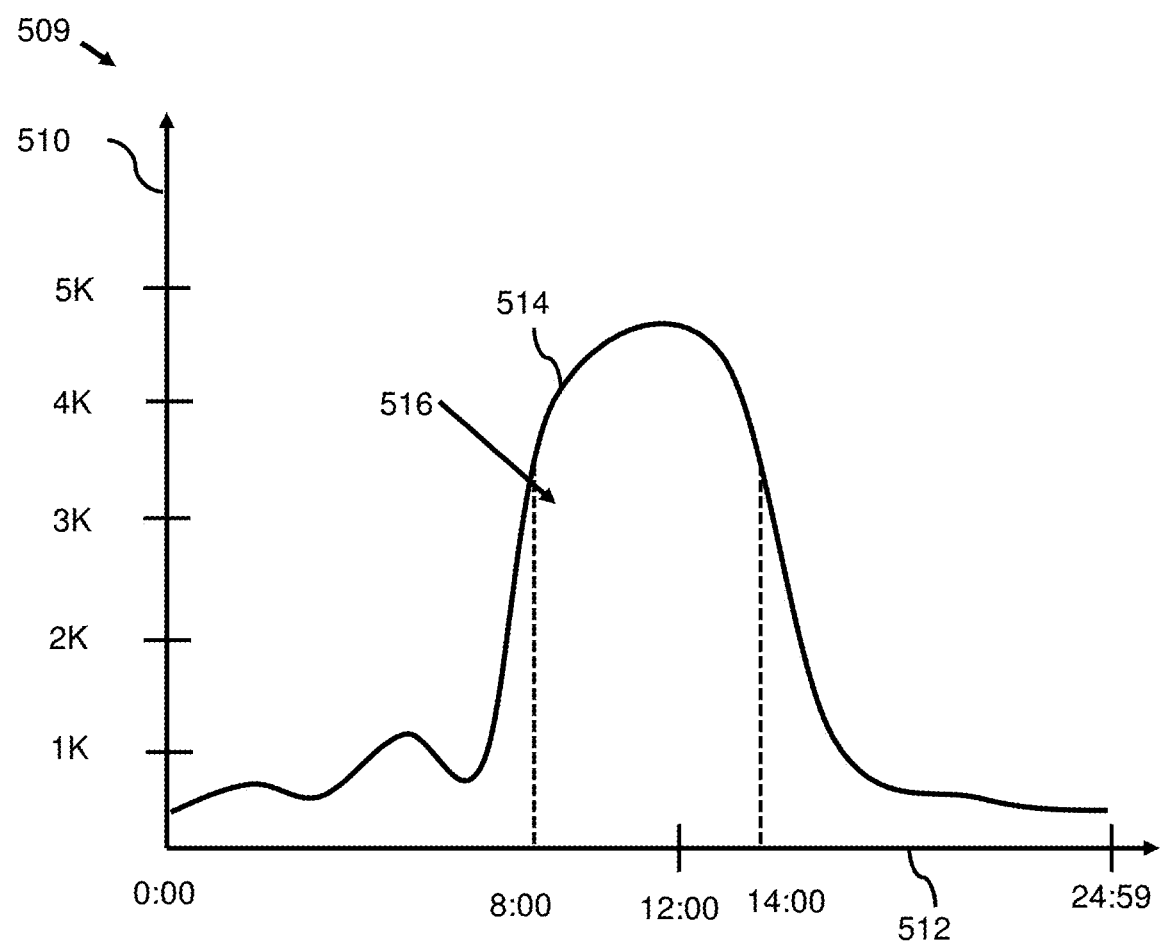
FIG. 5B illustrates an example graph of pushed OTA software updates being completely installed as a function time of day, within one time zone.

FIG. 5B illustrates an example graph 509 of pushed OTA software updates being completely installed as a function time of day, within one time zone. As shown in the figure, graph 508 includes a y-axis 510, an x-axis 512, and a function 514. Y-axis 510 corresponds to a number of completely installed global OTA software updates within an Eastern Standard time zone (for example, the east coast of the United States), whereas x-axis 512 corresponds to the time of day. Function 514 corresponds to the number of completely installed eastern standard time OTA software updates as a function of the time of day. Here, one can see that the majority of the completely installed OTA software updates are within area 516 that lies between 8:00 AM and 2:00 PM Eastern Standard Time. For purposes of discussion, let area 516 be two standards of deviation, indicating approximately 97% of the installations, and which may be a goal of a service provider.

In this case, the resources for operating a server to push the OTA software update prior to 8:00 PM and after 2:00 PM might not be considered an efficient use of the server to push the OTA software update.

Figure 5C:
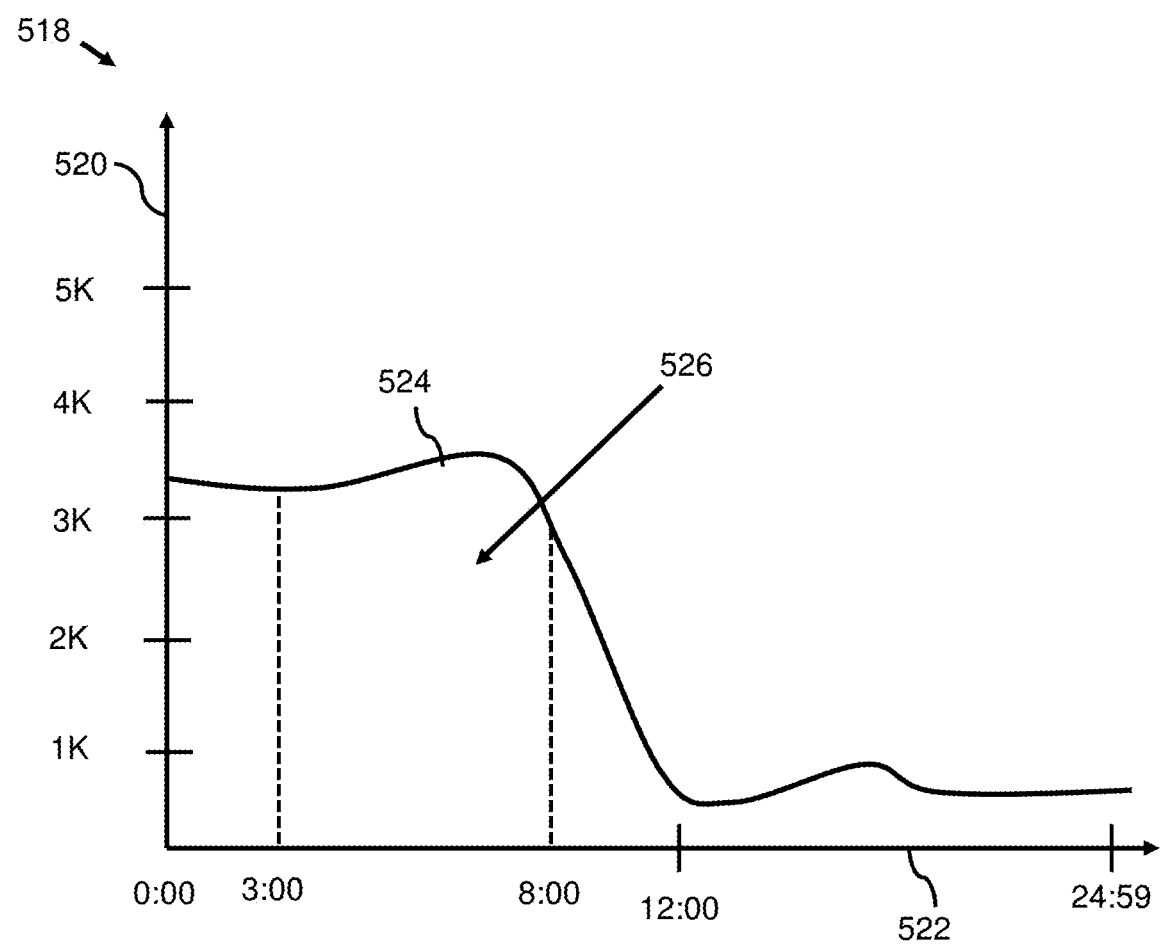
FIG. 5C illustrates an example graph of pushed OTA software updates being completely installed as a function time of day, within another time zone.

Conversely, FIG. 5C illustrates an example graph 518 of pushed OTA software updates being completely installed as a function time of day, within another time zone. As shown in the figure, graph 518 includes a y-axis 520, an x-axis 522, and a function 524. Y-axis 520 corresponds to a number of completely installed global OTA software updates within a Central time zone, whereas x-axis 522 corresponds to the time of day. Function 524 corresponds to the number of completely installed central time OTA software updates as a function of the time of day. Here, one can see that the majority of the completely installed OTA software updates are within area 526 that lies between 3:00 AM and 8:00 AM Central Standard Time. For purposes of discussion, let area 526 be two standards of deviation, indicating approximately 97% of the installations, and which may be a goal of a service provider.

In this case, the resources for operating a server to push the OTA software update prior to 3:00 AM and after 8:00 AM might not be considered an efficient use of the server to push the OTA software update.

Figure 6:
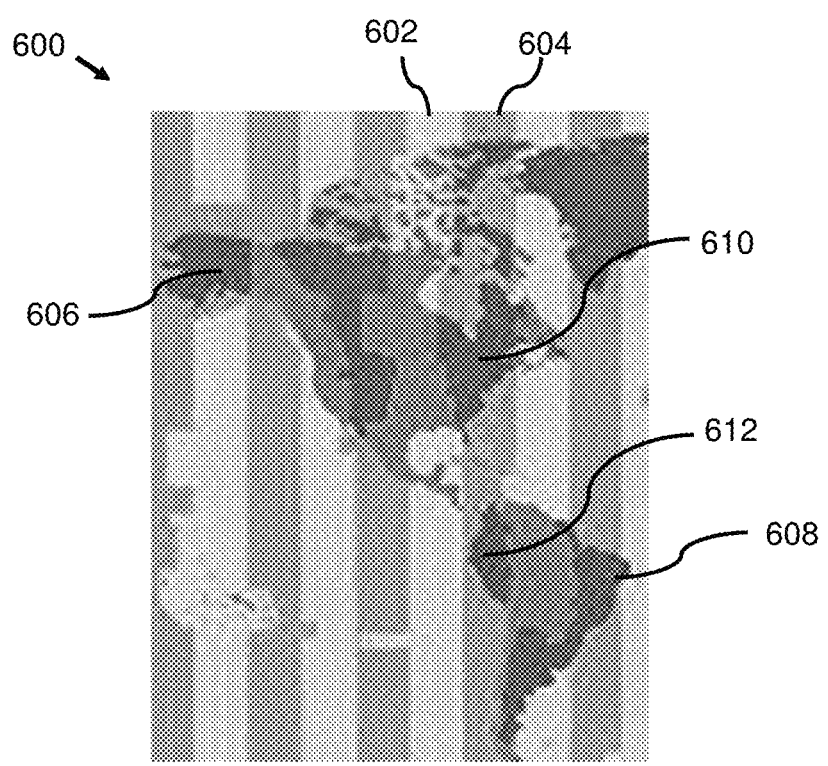
FIG. 6 illustrates time zones within North and South America.

FIG. 6 illustrates time zones within North and South America. As shown in the figure, a plurality of time zones, a sample of which include central time zone 602 and eastern standard time zone 604, span across both North America 606 and South America 608. For example, eastern standard zone 604 covers area 610 in North America 606 and covers area 612 in South America 608.

FIG. 6 is provided to help describe a situation in which a single time zone might have vastly varying installations for an OTA software update push. In particular, suppose for purposes of discussion, that in an OTA software update push, two standards of deviation of the installations within the time zone of area 610 of North America 606 lies between 5:00 PM and 7:00 PM. Further, suppose for purposes of discussion, that within the same time zone, but in area 612 of South America 608, only a small fraction of installations occur. This may be explained by cultural or political differences between the areas, as mentioned above.

In accordance with aspects of the present disclosure, by analyzing the OTA aggregate data, the optimal time period for installations of an OTA software update push may be determined for different time zones, different geographical areas, different delivery pathways (e.g., wired or wireless), and combinations thereof. In this way, a period of delivery for future OTA software updates may be optimized based on different time zones, different geographical areas, different delivery pathways (e.g., wired or wireless), and combinations thereof.

Returning to FIG. 4, after the OTA aggregate data is analyzed (S412) a future OTA push time period is predicted (S414). For example, as shown in FIG. 3, controller 302 executes instructions in OTA analytics program 314 to cause service provider 102 to predict a future OTA push time period. This will be described in greater detail with reference to FIG. 7B.

Figure 7B:
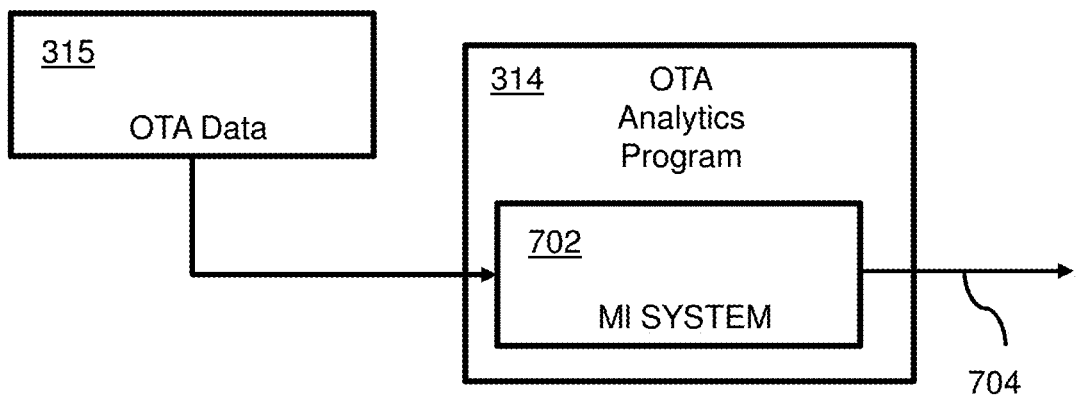
FIG. 7B illustrates the machine learning system of FIG. 7A using OTA data to predict a future OTA push time period in accordance with aspects of the present disclosure.

FIG. 7B illustrates the machine learning system of FIG. 7A using OTA data 315 to predict a future OTA push time period in accordance with aspects of the present disclosure. As shown in FIG. 7B, ML system 702 of OTA analytics program 314 may include instructions, that when executed by controller 302, cause service provider 102 to predict an optimized time period 704 for a future OTA software update push based on the OTA data 315.

Returning to FIG. 4, after the future OTA push time period is predicted (S414), a future OTA push instruction is generated (S416). For example, as shown in FIG. 3, controller 302 executes instructions in OTA analytics program 314 to cause controller 302 to generate a future OTA push instruction based on the predicted future OTA push time period. Controller 302 may additionally store the future OTA push instruction in OTA update program 312 so as to cause controller 302 to push the future OTA software update at the future time corresponding to the predicted future OTA push time period.

Returning to FIG. 4, after a future OTA push instruction is generated (S416), method 400 stops (S418).

In addition to predicting an optimal time period to push a future OTA software update to a plurality of vehicle, within a region, time zone, or combination thereof, and then subsequently pushing the future OTA software update at that predicted optimal time period, a system and method in accordance with aspects of the present disclosure additionally includes a dashboard to provide such information to a user.

For example, as shown in FIG. 3, controller 302 executes instructions in OTA update program 312 to cause service provider 102 to generate graphic user interface data to be provided to a display to cause the display to display a graphic user interface (GUI) as a dashboard that is associated with the predicted future OTA push time period.

In some embodiments, UI 306 may include a display, wherein the display of UI 306 may display a user dashboard that is associated with the predicted future OTA push time period. In some of these embodiments, the dashboard may display: the predicted future OTA push time period; the predetermined area for the predicted OTA software update; the predetermined country for the predicted OTA software update; the predetermined delivery pathways (e.g., wired or wireless) for the predicted OTA software update; and combinations thereof. Further, in some of these embodiments, the dashboard may display information related to received OTA aggregate data after the future OTA software update is pushed.

Prior art systems for pushing OTA software updates unfortunately have pushed software updates over extended time periods, which wastes processing resources and increases the costs of operation.

In accordance with aspects of the present disclosure, an optimal push time period is predicted based on analyzed a priori data. By only pushing an OTA software update to predetermined countries, time zones, pathways, and combinations thereof, at predicted optimal time periods, processing resources are minimized, which decreases the costs of operation.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A system for use with over-the-air (OTA) analytic data corresponding to OTA aggregate data associated with an OTA push of a software update for a plurality of vehicles to a plurality of devices, associated with the plurality of vehicles, said system comprising:
 a data receiver configured to receive the OTA aggregate data;
 a memory having instructions stored therein; and
 a processor configured to execute the instructions stored in said memory to cause said system to:
  store the received OTA aggregate data into said memory;
  analyze the OTA aggregate data to determine an optimized time period for the OTA push;
  predict a future OTA push time period based on the optimized time period;
  generate a future OTA push instruction based on the predicted future OTA push time period; and
  generate the software update to be provided to the plurality of devices during the predicted future OTA push time period based on the future OTA push instruction so as to cause at least one of the plurality of vehicles to download the software update.

2. The system of claim 1, wherein said processor is further configured to execute the instructions stored in said memory to additionally cause said system to:

analyze the OTA aggregate data to determine an optimized time period for a predetermined time zone for the OTA push;
predict a future OTA push time period for the predetermined time zone based on the optimized time period for the predetermined time zone; and
generate a future OTA push instruction for the predetermined time zone based on the predicted future OTA push time period for the predetermined time zone.

3. The system of claim 1, wherein said processor is further configured to execute the instructions stored in said memory to additionally cause said system to:
analyze the OTA aggregate data to determine an optimized time period for a predetermined country for the OTA push;
predict a future OTA push time period for a predetermined time zone based on the optimized time period for the predetermined country; and
generate a future OTA push instruction for the predetermined time zone based on the predicted future OTA push time period for the predetermined country.

4. The system of claim 1, for additional use with a display, wherein said processor is further configured to execute the instructions stored in said memory to additionally cause said system to generate graphic user interface data to be provided to the display to cause the display to display a graphic user interface associated with the predicted future OTA push time period based on at least one of a predetermined time zone and a predetermined country.

5. The system of claim 1, wherein said processor is further configured to execute the instructions stored in said memory to additionally cause said system to analyze the OTA aggregate data to determine the optimized time period for the OTA push via a machine learning algorithm.

6. The system of claim 5, wherein said processor is further configured to execute the instructions stored in said memory to additionally cause said system to analyze the OTA aggregate data to determine an optimized time period for the OTA push via a neural network performing the machine learning algorithm.

7. The system of claim 1, wherein said data receiver is configured to receive the OTA aggregate data via at least one of a cellular network and a wired network.

8. A method of using a system with over-the-air (OTA) analytic data corresponding to OTA aggregate data associated with an OTA push of a software update for a plurality of vehicles to a plurality of devices associated with the plurality of vehicles, the method comprising:
receiving, via a data receiver, the OTA aggregate data;
storing, via a processor configured to execute instruction stored in a memory, the received OTA aggregate data into the memory;
analyzing, via the processor, the OTA aggregate data to determine an optimized time period for the OTA push;
predicting, via the processor, a future OTA push time period based on the optimized time period;
generating, via the processor, the software update to be provided to the plurality of devices during the predicted future OTA push time period based on the future OTA push instruction so as to cause at least one of the plurality of vehicles to download the software update.

9. The method of claim 8, further comprising:
analyzing, via the processor, the OTA aggregate data to determine an optimized time period for a predetermined time zone for the OTA push;
predicting, via the processor, a future OTA push time period for the predetermined time zone based on the optimized time period for the predetermined time zone; and
generating, via the processor, a future OTA push instruction for the predetermined time zone based on the predicted future OTA push time period for the predetermined time zone.

10. The method of claim 8, further comprising:
analyzing, via the processor, the OTA aggregate data to determine an optimized time period for a predetermined country for the OTA push;
predicting, via the processor, a future OTA push time period for the predetermined time zone based on the optimized time period for the predetermined country; and
generating, via the processor, a future OTA push instruction for the predetermined time zone based on the predicted future OTA push time period for the predetermined country.

11. The method of claim 8, for additional use with a display, further comprising:
generating, via the processor, graphic user interface data to be provided to the display to cause the display to display a graphic user interface associated with the predicted future OTA push time period based on at least one of a predetermined time zone and a predetermined country.

12. The method of claim 8, further comprising analyzing, via the processor, the OTA aggregate data to determine the optimized time period for the OTA push via a machine learning algorithm.

13. The method of claim 12, further comprising analyzing, via the processor, the OTA aggregate data to determine an optimized time period for the OTA push via a neural network performing the machine learning algorithm.

14. The method of claim 8, wherein said receiving, via the data receiver, the OTA aggregate data comprises receiving OTA aggregate data via at least one of a cellular network and a wired network.

15. A non-transitory, computer-readable media having computer-readable instructions stored thereon, the computer-readable instructions being capable of being read by a system for use with over-the-air (OTA) analytic data corresponding to OTA aggregate data associated with an OTA push of a software update for a plurality of vehicles to a plurality of devices associated with the plurality of vehicles, wherein the computer-readable instructions are capable of instructing the system to perform the method comprising:
receiving, via a data receiver, the OTA aggregate data;
storing, via a processor configured to execute instruction stored in a memory, the received OTA aggregate data into the memory;
analyzing, via the processor, the OTA aggregate data to determine an optimized time period for the OTA push;
predicting, via the processor, a future OTA push time period based on the optimized time period;
generating, via the processor, a future OTA push instruction based on the predicted future OTA push time period; and
generating, via the processor, the software update to be provided to the plurality of devices during the predicted future OTA push time period based on the future OTA push instruction so as to cause at least one of the plurality of vehicles to download the software update.

16. The non-transitory, computer-readable media of claim 15, wherein the computer-readable instructions are capable of instructing the system to perform the method further comprising:
- analyzing, via the processor, the OTA aggregate data to determine an optimized time period for a predetermined time zone for the OTA push;
- predicting, via the processor, a future OTA push time period for the predetermined time zone based on the optimized time period for the predetermined time zone; and
- generating, via the processor, a future OTA push instruction for the predetermined time zone based on the predicted future OTA push time period for the predetermined time zone.

17. The non-transitory, computer-readable media of claim 15, wherein the computer-readable instructions are capable of instructing the system to perform the method further comprising:
- analyzing, via the processor, the OTA aggregate data to determine an optimized time period for a predetermined country for the OTA push;
- predicting, via the processor, a future OTA push time period for a predetermined time zone based on the optimized time period for the predetermined country; and
- generating, via the processor, a future OTA push instruction for the predetermined time zone based on the predicted future OTA push time period for the predetermined country.

18. The non-transitory, computer-readable media of claim 15, for additional use with a display, wherein the computer-readable instructions are capable of instructing the system to perform the method further comprising:
- generating, via the processor, graphic user interface data to be provided to the display to cause the display to display a graphic user interface associated with the predicted future OTA push time period based on at least one of a predetermined time zone and a predetermined country.

19. The non-transitory, computer-readable media of claim 15, wherein the computer-readable instructions are capable of instructing the system to perform the method further comprising analyzing, via the processor, the OTA aggregate data to determine the optimized time period for the OTA push via a machine learning algorithm.

20. The non-transitory, computer-readable media of claim 19, wherein the computer-readable instructions are capable of instructing the system to perform the method further comprising analyzing, via the processor, the OTA aggregate data to determine an optimized time period for the OTA push via a neural network performing the machine learning algorithm.

* * * * *